(12) United States Patent
Patel et al.

(10) Patent No.: US 12,514,852 B2
(45) Date of Patent: Jan. 6, 2026

(54) FORMULATIONS CONTAINING DEUTERATED DOMPERIDONE

(71) Applicant: CINDOME PHARMA, INC., Cincinnati, OH (US)

(72) Inventors: Piyush Patel, Garnet Valley, PA (US); Catherine Pearce, Montgomery, OH (US); Jonathan Isaacsohn, Cincinnati, OH (US)

(73) Assignee: CINDOME PHARMA, INC., Cincinnati, OH (US)

( * ) Notice: Subject to any disclaimer, the term of this patent is extended or adjusted under 35 U.S.C. 154(b) by 970 days.

(21) Appl. No.: 17/287,571

(22) PCT Filed: Oct. 25, 2019

(86) PCT No.: PCT/US2019/058033
§ 371 (c)(1),
(2) Date: Apr. 22, 2021

(87) PCT Pub. No.: WO2020/086947
PCT Pub. Date: Apr. 30, 2020

(65) Prior Publication Data
US 2022/0110929 A1    Apr. 14, 2022

Related U.S. Application Data

(60) Provisional application No. 62/750,491, filed on Oct. 25, 2018.

(51) Int. Cl.
| | |
|---|---|
| *A61K 31/454* | (2006.01) |
| *A61K 31/085* | (2006.01) |
| *A61K 47/10* | (2017.01) |
| *A61K 47/14* | (2017.01) |
| *A61P 1/08* | (2006.01) |
| *C07B 59/00* | (2006.01) |

(52) U.S. Cl.
CPC .......... *A61K 31/454* (2013.01); *A61K 31/085* (2013.01); *A61K 47/10* (2013.01); *A61K 47/14* (2013.01); *A61P 1/08* (2018.01); *C07B 59/002* (2013.01); *C07B 2200/05* (2013.01)

(58) Field of Classification Search
CPC .... A61K 31/454; A61K 31/05; A61K 31/085; A61K 47/10; A61K 47/14; A61K 9/10; A61K 9/2013; A61K 9/2031; A61K 9/4858; A61K 9/4866; A61P 1/08; A61P 1/04; C07B 59/002; C07B 2200/05
See application file for complete search history.

(56) References Cited

U.S. PATENT DOCUMENTS

| | | | |
|---|---|---|---|
| 9,943,513 B1 | 4/2018 | Hughey et al. | |
| 2005/0220825 A1 | 10/2005 | Funke et al. | |
| 2010/0255096 A1 | 10/2010 | Aronchick | |
| 2012/0244215 A1* | 9/2012 | Giliyar | A61K 9/4875 424/452 |

(Continued)

FOREIGN PATENT DOCUMENTS

| | | |
|---|---|---|
| CN | 1686128 A | 10/2005 |
| CN | 102125528 A | 7/2011 |

(Continued)

OTHER PUBLICATIONS

Savla, R., et al. Tumor-targeted responsive nanoparticle-based systems for magnetic resonance imaging and therapy. Pharmaceutical research, 2014. vol. 31(12): 3487-3502. (Year: 2014).*

Ganesan et al.; "Lipid nanoparticles: Different preparation techniques, characterization, hurdles, and strategies for the production of solid lipid nanoparticles and nanostructured lipid carriers for oral drug delivery"; Sustainable Chemistry and Pharmacy; vol. 6; Dec. 2017; p. 37-56.

Jakki et al.; "Development of a self-microemulsifying drug delivery system of domperidone: In vitro and in vivo characterization"; vol. 63; 2013; p. 241-251.

(Continued)

*Primary Examiner* — Jean P Cornet
*Assistant Examiner* — Chihyi Lee
(74) *Attorney, Agent, or Firm* — BakerHostetler

(57) ABSTRACT

The disclosure provides pharmaceutical formulations comprising d4-domperidone of the formula (I): (I) or a pharmaceutically acceptable salt thereof. The formulations also contain (i) a glyceryl stearate, and a medium chain triglyceride; or (ii) a stearoyl polyoxyl glyceride, a nonionic poly(ethylene oxide) polymer, and a medium chain triglyceride; or (iii) a nonionic poly(ethylene oxide) polymer, and a polyethylene glycol. The disclosure also provides methods for treating a disorder that is gastroparesis, nausea apart from gastroparesis, vomiting apart from gastroparesis, nausea associated with gastroparesis, vomiting associated with gastroparesis, gastroesophageal reflux disease, insufficient lactation, or a combination thereof in a patient, comprising administering to the patient a formulation described herein. In some aspects, the disorder is gastroparesis. In other aspects, the disorder is gastroesophageal reflux disease. In further aspects, the disorder is insufficient lactation.

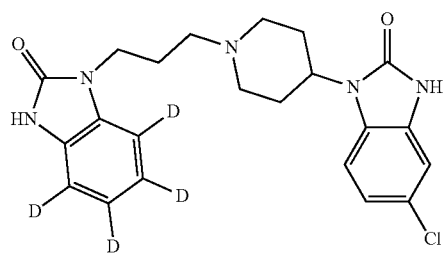

24 Claims, 8 Drawing Sheets

(56) References Cited

U.S. PATENT DOCUMENTS

| | | | |
|---|---|---|---|
| 2013/0115294 A1* | 5/2013 | First | A61K 31/4439 424/490 |
| 2017/0298046 A1 | 10/2017 | Soldano et al. | |
| 2022/0110927 A1 | 4/2022 | Patel et al. | |

FOREIGN PATENT DOCUMENTS

| | | |
|---|---|---|
| CN | 108697700 A | 10/2018 |
| EP | 3668510 B1 | 1/2021 |
| RU | 2195935 C2 | 1/2003 |
| WO | 1998/034612 A1 | 8/1998 |
| WO | 2000/059475 A1 | 10/2000 |
| WO | 2017/136617 A1 | 8/2017 |

OTHER PUBLICATIONS

Khosa et al.; "Nanostructured lipid carriers for site-specific drug delivery"; Biomedicine & Pharmacotherapy; vol. 103; Jul. 2018; p. 598-613.

Prajapati et al.; "Floating Matrix Tablets of Domperidone Formulation and Optimization Using Simplex Lattice Design"; Iranian Journal of Pharmaceutical Research; vol. 10(3); 2011; p. 447-455.

I. M. Pertsev; Pharmaceutical and Medical and Biological Aspects of Medicine; vol. 1; 1999; p. 253-254.

ISA/220—Notification of Transmittal or Search Report and Written Opinion of the ISA, or the Declaration Mailed on Feb. 25, 2020 for WO Application No. PCT/US19/058037.

New Handbook of Common Medicines, edited by Jinhong Hu, p. 352, Jindun Press, published on Mar. 31, 2009 (contains English Excerpt).

SG Office Action(Written Opinion) Mailed on May 20, 2022 for SG Application No. 11202103295V.

Wang Feng Jing et al.; "Pediatric nursing"; China Medical Science and Technology Press; 2016; 10 pages (contains English Translation).

"Polyox Water-Soluble Resins NF in Pharmaceutical Applications"; The Dow Chemical Company; Aug. 2004; 12 pages.

Dhawan et al.; "High Molecular Weight Poly(ethylene oxide)-Based Drug Delivery Systems Part I: Hydrogels and Hydrophilic Matrix Systems"; Data and Review; 2005; 8 pages.

Heykants et al.; "On the pharmacokinetics of domperidone in animals and man I. Plasma levels of domperidone in rats and dogs. Age related absorption and passage through the blood brain barrier in rats"; European Journal of Drug Metabolism and Pharmacokinetics; vol. 6; 1981; p. 27-36.

IPEA/409—International Preliminary Report on Patentability Mailed on May 6, 2021 for WO Application No. PCT/US19/058033.

ISA/220—Notification of Transmittal or Search Report and Written Opinion of the ISA, or the Declaration Mailed on Feb. 25, 2020 for WO Application No. PCT/US19/058033.

Miyazaki et al.; "Rate-Correction Technique for QT Interval in Long-Term Telemetry ECG Recording in Beagle Dogs"; Experimental Animals; vol. 51; 2002; p. 465-475.

Spence et al.; "The Heart Rate-Corrected QT Interval of Conscious Beagle Dogs: A Formula Based on Analysis of Covariance"; Toxicological Sciences; vol. 45; Oct. 1998; p. 247-258.

Asztalos, E.V. et al. Enhancing Human Milk Production With Domperidone in Mothers of Preterm Infants: Results From the Empower Trial. Journal of Human Lactation., 2017. vol. 33(1):181-187.

* cited by examiner

| PLACEBO | ACTIVE |
|---|---|
| Medium chain triglycerides are dispensed in a suitable stainless steel container. | Medium chain triglycerides are dispensed in a suitable stainless steel container. |
| ↓ | ↓ |
| Butylated hydroxytoluene and butylated hydroxyanisole are weighed separately and transferred into the mixing vessel while mixing. Mixing is continued until all dissolved. MCT may be warmed to 35 ± 5 °C to dissolve the BHA / BHT. | Butylated hydroxytoluene and butylated hydroxyanisole are weighed separately and transferred into the mixing vessel while mixing. Mixing is continued until all dissolved. MCT may be warmed to 35 ± 5 °C to dissolve the BHA / BHT. |
| ↓ | ↓ |
| Pre-weighed Precirol ATO 5 is added to the MCT and mixed thoroughly using a bench top mixer (200-600 rpm) to achieve a homogenous suspension. | Pre-weighed Precirol ATO 5 is added to the MCT and mixed thoroughly using a bench top mixer (200-600 rpm) to achieve a homogenous suspension. |
| ↓ | ↓ |
| The final mixture should be homogenized for 15 ± 5 minutes to achieve a lump-free suspension. | The final mixture should be homogenized for 15 ± 5 minutes to achieve a lump-free suspension. |
| ↓ | ↓ |
| Once a homogenous suspension is achieved, the mixture is deaerated until it is free of air bubbles. | Pre-weighed $d_4$-domperidone is added to the suspension and mixed thoroughly using a bench top mixer (200-600 rpm) to achieve a homogenous suspension. |
|  | ↓ |
|  | Once a homogenous suspension is achieved, the mixture is deaerated until it is free of air bubbles. Collect a composite sample from middle of the medicine container for in-process assay testing. |

FIG. 7

FORMULATIONS CONTAINING DEUTERATED DOMPERIDONE

CROSS-REFERENCE TO RELATED APPLICATIONS

This application is the National Stage application of International Patent Application No. PCT/US2019/058033, filed Oct. 25, 2019, which claims priority to U.S. Provisional Patent Application No. 62/750,491, filed Oct. 25, 2018, the disclosures of which are incorporated by reference herein.

TECHNICAL FIELD

This disclosure relates to pharmaceutical formulations containing $d_4$-domperidone.

BACKGROUND

Gastroparesis is a condition where motility of the stomach does not function or does not function properly, which prevents the stomach from emptying and interferes with digestion. Treatment of gastroparesis requires medications, e.g., metoclopramide, erythromycin, or cisapride, to stimulate the stomach muscles. Metoclopramide poses serious side effects, such as development of movement disorders or adverse interactions with other medications; erythromycin is susceptible to loss of efficacy as patient drug tolerance increases; and cisapride has limited accessibility.

Medications to control nausea and vomiting, e.g., prochlorperazine, thiethylperazine, diphenhydramine, or ondansetron, may also be administered to treat gastroparesis. The symptoms of gastroparesis also may be treated surgically, such as installing jejunostomy tubes, gastric venting tubes, or feeding tubes.

Domperidone, in both deuterated and non-deuterated forms, is an effective dopamine antagonist that does not readily cross the blood-brain barrier and may be used to treat gastroparesis. Safe and efficacious formulations of domperidone are needed.

SUMMARY

In some embodiments, the disclosure provides pharmaceutical formulation comprising $d_4$-domperidone of the formula (I):

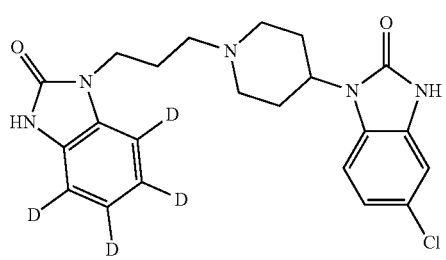 [SMILES: [2H]c1c([2H])c([2H])c2c([nH]c(=O)n2CCCN2CCC(n3c(=O)[nH]c4cc(Cl)ccc43)CC2)c1[2H]]

or a pharmaceutically acceptable salt thereof; a glyceryl stearate, and a medium chain triglyceride.

In other embodiments, the disclosure provides pharmaceutical formulations comprising $d_4$-domperidone of the formula (I):

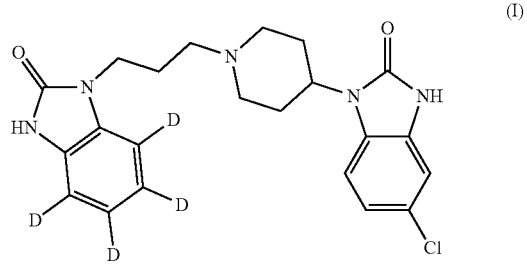 [SMILES: [2H]c1c([2H])c([2H])c2c([nH]c(=O)n2CCCN2CCC(n3c(=O)[nH]c4cc(Cl)ccc43)CC2)c1[2H]]

or a pharmaceutically acceptable salt thereof; a stearoyl polyoxyl glyceride, a nonionic poly(ethylene oxide) polymer, and a medium chain triglyceride.

In further embodiments, the disclosure provides pharmaceutical formulations comprising $d_4$-domperidone of the formula (I):

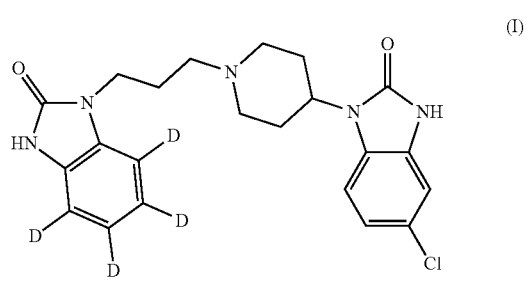 [SMILES: [2H]c1c([2H])c([2H])c2c([nH]c(=O)n2CCCN2CCC(n3c(=O)[nH]c4cc(Cl)ccc43)CC2)c1[2H]]

or a pharmaceutically acceptable salt thereof; a nonionic poly(ethylene oxide) polymer, and a polyethylene glycol.

In still other embodiments, the disclosure provides methods for treating a disorder that is gastroparesis, nausea apart from gastroparesis, vomiting apart from gastroparesis, nausea associated with gastroparesis, vomiting associated with gastroparesis, gastroesophageal reflux disease, insufficient lactation, or a combination thereof in a patient, comprising administering to the patient a formulation described herein. In some aspects, the disorder is gastroparesis. In other aspects, the disorder is gastroesophageal reflux disease. In further aspects, the disorder is insufficient lactation.

Other aspects and embodiments of the invention will be readily apparent from the following detailed description of the invention.

BRIEF DESCRIPTION OF THE DRAWINGS

The present application is further understood when read in conjunction with the appended drawings. For the purpose of illustrating the subject matter, there are shown in the drawings exemplary embodiments of the subject matter; however, the presently disclosed subject matter is not limited to the specific compositions, methods, devices, and systems disclosed. In addition, the drawings are not necessarily drawn to scale.

FIG. 7 is a flowchart for the fill compounding of the $d_4$-domperidone placebo and the 5 mg and 10 mg domperidone samples.

DETAILED DESCRIPTION OF ILLUSTRATIVE EMBODIMENTS

Figure 1:
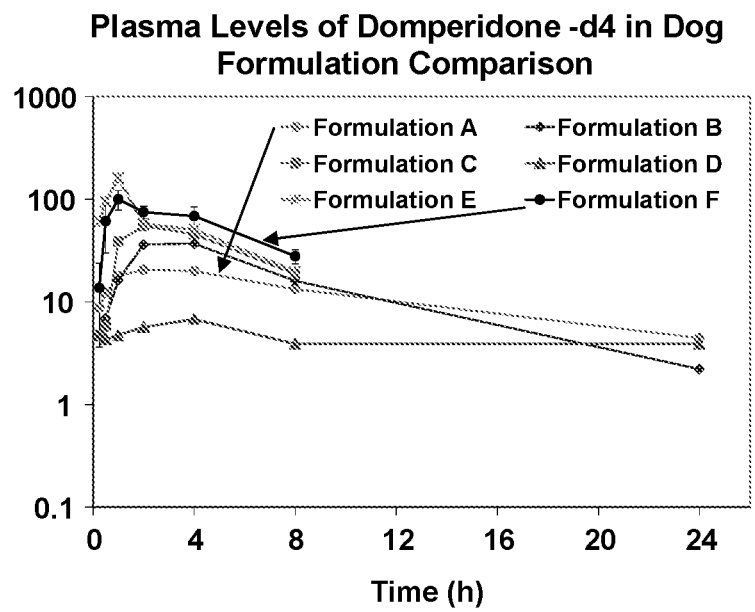
FIG. 1 is a line graph showing the resulting plasma levels of $d_4$-domperidone after administration of Formulations A-F.

In the disclosure, the singular forms "a,", "an," and "the" include the plural reference, and reference to a particular numerical value includes at least that particular value, unless the context clearly indicates otherwise. Thus, for example, a reference to "a material" is a reference to at least one of such materials and equivalents thereof known to those skilled in the art, and so forth.

When a value is expressed as an approximation by use of the descriptor "about" it will be understood that the particular value forms another embodiment. In general, use of the term "about" indicates approximations that can vary depending on the desired properties sought to be obtained by the disclosed subject matter and is to be interpreted in the specific context in which it is used, based on its function. The person skilled in the art will be able to interpret this as a matter of routine. In some cases, the number of significant figures used for a particular value may be one non-limiting method of determining the extent of the word "about." In other cases, the gradations used in a series of values may be used to determine the intended range available to the term "about" for each value. Where present, all ranges are inclusive and combinable. That is, references to values stated in ranges include every value within that range.

When a list is presented, unless stated otherwise, it is to be understood that each individual element of that list and every combination of that list is to be interpreted as a separate embodiment. For example, a list of embodiments presented as "A, B, or C" is to be interpreted as including the embodiments, "A," "B," "C," "A or B," "A or C," "B or C," or "A, B, or C."

It is to be appreciated that certain features of the invention which are, for clarity, described herein in the context of separate embodiments, may also be provided in combination in a single embodiment. That is, unless obviously incompatible or excluded, each individual embodiment is deemed to be combinable with any other embodiment(s) and such a combination is considered to be another embodiment. Conversely, various features of the invention that are, for brevity, described in the context of a single embodiment, may also be provided separately or in any sub-combination. It is further noted that the claims may be drafted to exclude an optional element. As such, this statement is intended to serve as antecedent basis for use of such exclusive terminology as "solely," "only" and the like in connection with the recitation of claim elements, or use of a "negative" limitation. Finally, while an embodiment may be described as part of a series of steps or part of a more general structure, each said step may also be considered an independent embodiment in itself.

The terms "subject" and "patient" are used interchangeably and typically refer to mammals. In some embodiments, the patient or subject is a human. In other embodiments, the patient or subject is a veterinary or farm animal, a domestic animal or pet, or animal used for conducting clinical research.

"Treating" or variations thereof refers to eliminating or reducing at least one physical parameter of the disease or disorder.

"Domperidone" as referenced herein refers to 5-chloro-1-(1-[3-(2-oxo-2,3-dihydro-1H-benzo[d]imidazol-1-yl)propyl]piperidin-4-yl)-1H-benzo[d]imidazol-2(3H)-one, which has the following structure:

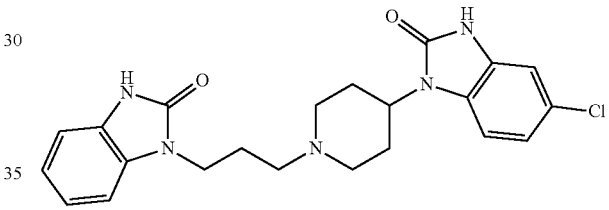

"D$_4$-domperidone" as referenced herein refers to 1-{3-[4-(5-chloro-2-oxo-2,3-dihydro-1H-1,3-benzodiazol-1-yl)piperidin-1yl]propyl}-2,3-dihydro(4,5,6,7-D4)-1H-1,3-benzodiazol-2-one, which has the following structure:

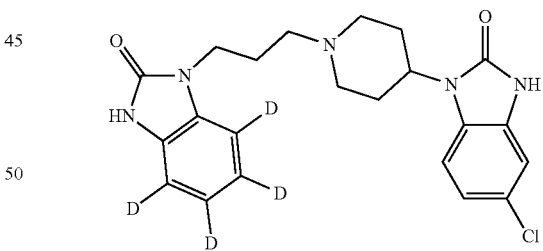

Any reference to $d_4$-domperidone may also include, where noted, pharmaceutically acceptable salts, esters, hydrates, solvates, prodrug forms, and derivatives of these, which are broadly defined as $d_4$-domperidone compounds that are modified or partially substituted, examples include but are not limited to adding a single atom, adding a reactive group, adding a functional group, forming a dimer or multimer, conjugating to another molecule such as an antibody, etc.

"Pharmaceutically acceptable" refers to properties and/or substances that are acceptable to the patient from a pharmacological/toxicological vantage, and to the manufacturing pharmaceutical chemist from a physical/chemical vantage regarding composition, formulation, stability, patient acceptance, and bioavailability.

A pharmaceutically acceptable salt includes salts with a pharmaceutically acceptable acid or base, e.g., inorganic acids, e.g., hydrochloric, sulfuric, phosphoric, diphosphoric, hydrobromic, hydroiodic and nitric acid and organic acids, for example citric, fumaric, maleic, malic, mandelic, ascorbic, oxalic, succinic, tartaric, benzoic, acetic, methanesulphonic, ethanesulphonic, benzenesulphonic, cyclohexylsulfamic (cyclamic) or p-toluenesulphonic acid. Pharmaceutically acceptable bases include alkali metal, e.g. sodium or potassium, and alkali earth metal, e.g. calcium or magnesium, hydroxides, and organic bases, e.g., alkyl amines, arylalkyl amines and heterocyclic amines.

The abbreviation "D," as used herein, refers to a stable isotope of hydrogen that is deuterium (heavy hydrogen or $^2$H). Such instances of "D" include an amount of deuterium that is above the naturally occurring distribution of deuterium. In some embodiments, D has deuterium enrichment of no less than about 1%. In other embodiments, D has a deuterium enrichment of no less than about 5%. In further embodiments, D has a deuterium enrichment of no less than about 10%. In still other embodiments, D has a deuterium enrichment of no less than about 20%. In still other embodiments, D has a deuterium enrichment of no less than about 30%. In still other embodiments, D has a deuterium enrichment of no less than about 40%. In yet further embodiments, D has a deuterium enrichment of no less than about 50%. In still other embodiments, D has a deuterium enrichment of no less than about 60%. In other embodiments, D has a deuterium enrichment of no less than about 70%. In further embodiments, D has a deuterium enrichment of no less than about 80%. In yet other embodiments, D has a deuterium enrichment of no less than about 90%. In still further embodiments, D has a deuterium enrichment of no less than about 98% of deuterium. In still further embodiments, D has a deuterium enrichment of no less than about 99% of deuterium. In still further embodiments, D has a deuterium enrichment of at least 99% of deuterium.

It has now been discovered that formulations of non-deuterated domperidone exhibited corrected QT ($QT_c$) prolongation, which can have potentially deadly effects. Without wishing to be held to any particular theory, it is speculated that the QT prolongation might be associated with the relatively high $C_{max}$ that was also observed with those non-deuterated domperidone formulations.

Pharmaceutical formulations containing $d_4$-domperidone described herein exhibit a variety of unexpected effects when administered to in vivo. In some embodiments, these pharmaceutical formulations result in a reduced $C_{max}$ as compared to formulations containing domperidone. In other embodiments, these pharmaceutical formulations result in a lowering of the AUC as compared to formulations containing domperidone. In further embodiments, these pharmaceutical formulations result in a reduced $C_{max}$ and a comparable AUC. In addition, as disclosure herein, the described $d_4$-domperidone formulations have much higher bioavailability as compared to non-deuterated domperidone.

The pharmaceutical formulations contain about 1 to about 20% (w/w), based on the weight of the formulation, of $d_4$-domperidone. In some embodiments, the pharmaceutical formulations contain about 2 to about 19% (w/w), about 3 to about 18% (w/w), about 4 to about 17% (w/w), about 5 to about 16% (w/w), about 6 to about 15% (w/w), about 7 to about 15% (w/w), about 8 to about 14% (w/w), about 9 to about 13% (w/w), about 10 to about 12% (w/w), about 5 to about 15% (w/w), about 5 to about 14% (w/w), about 5 to about 13% (w/w), about 5 to about 12% (w/w), about 5 to about 11% (w/w), about 5 to about 10% (w/w), about 5 to about 9% (w/w), about 1 to about 15% (w/w), or about 1 to about 10% (w/w) of $d_4$-domperidone. In other embodiments, the pharmaceutical formulations contain about 5 to about 12% (w/w) of $d_4$-domperidone. In further embodiments, the pharmaceutical formulations contain about 1, about 2, about 3, about 4, about 5, about 6, about 7, about 8, about 9, about 10, about 11, about 12, about 13, about 14, about 15, about 16, about 17, about 18, about 19, or about 20% (w/w) of $d_4$-domperidone. In still other embodiments the pharmaceutical formulations contain about 10% (w/w) of $d_4$-domperidone.

The amount of $d_4$-domperidone in the pharmaceutical formulations may also be expressed by way of an amount. In some embodiments, the pharmaceutical formulations contain about 1 to about 50 mg of $d_4$-domperidone. In other embodiments, the pharmaceutical formulations contain about 5 to about 45 mg, about 10 to about 40 mg, about 15 to about 35 mg, about 20 to about 30 mg, about 1 to about 45 mg, about 1 to about 40 mg, about 1 to about 35 mg, about 1 to about 30 mg, about 1 to about 25 mg, about 1 to about 20 mg, about 1 to about 15 mg, about 5 to about 50 mg, about 5 to about 40 mg, about 5 to about 35 mg, about 5 to about 30 mg, about 5 to about 25 mg, about 5 to about 20 mg, about 5 to about 15 mg, about 10 to about 50 mg, about 20 to about 50 mg, about 30 to about 50 mg, or about 40 to about 50 mg of $d_4$-domperidone. In further embodiments, the pharmaceutical formulations contain about 1, about 2, about 3, about 4, about 5, about 6, about 7, about 8, about 9, about 10, about 11, about 12, about 13, about 14, about 15, about 16, about 17, about 18, about 19, about 20, about 21, about 22, about 23, about 24, about 25, about 26, about 27, about 28, about 29, about 30, about 31, about 32, about 33, about 34, about 35, about 36, about 37, about 38, about 39, about 40, about 41, about 42, about 43, about 44, about 45, about 46, about 47, about 48, about 49, or about 50 mg of $d_4$-domperidone.

$D_4$-Domperidone Formulations Containing a Glyceryl Stearate and Medium Chain Triglyceride In some embodiments, the present disclosure provides pharmaceutical formulations comprising $d_4$-domperidone or a pharmaceutically acceptable salt thereof, a glyceryl stearate, and a medium chain triglyceride.

As one component, the pharmaceutical formulations contain a glyceryl stearate. The term "glyceryl stearate" as used herein refers to a compound having glyceryl and stearate components as shown below, where the components are bound together to form a chemically stable molecule.

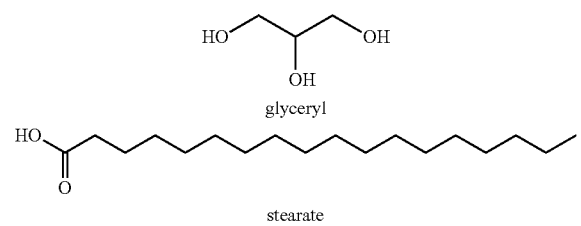

In some embodiments, the glyceryl stearate is a glyceryl palmitostearate. In other embodiments the glyceryl stearate is a glycerol distearate. In further embodiments, the glyceryl stearate is a glyceryl distearate. In yet other embodiments, the pharmaceutical formulation may contain combinations of glyceryl stearates. Thus, the pharmaceutical formulation may contain 1, 2, 3, 4, or more glyceryl stearates. In some embodiments, the pharmaceutical formulations contain glyceryl palmitostearate and glycerol distearate. In other embodiments, the pharmaceutical formulations contain glyceryl palmitostearate and glyceryl distearate. In further embodiments, the pharmaceutical formulations contain glycerol distearate and glyceryl distearate. In yet other embodiments, the pharmaceutical formulations contain glyceryl palmitostearate, glycerol distearate, and glyceryl distearate. In still other embodiments, the glyceryl stearate is PRECIROL® ATO 5.

The pharmaceutical formulations contain about 2 to about 20% (w/w), based on the weight of the formulation, of the glyceryl stearate. In some embodiments, the pharmaceutical formulations contain about 5 to about 15% (w/w) of the glyceryl stearate. In further embodiments, the pharmaceutical formulations contain about 6 to about 14% (w/w), about 7 to about 13% (w/w), about 8 to about 12% (w/w), about 9 to about 11% (w/w), or 5 to about 15% (w/w) of the glyceryl stearate. In other embodiments, the pharmaceutical formulations contain about 5, about 6, about 7, about 8, about 9, about 10, about 11, about 12, about 13, about 14, or about 15% (w/w) of the glyceryl stearate. In yet further embodiments, the pharmaceutical formulations contain about 9% (w/w) of the glyceryl stearate. In still other embodiments, the pharmaceutical formulations contain about 10% (w/w) of the glyceryl stearate.

The term "medium chain triglyceride" as used herein refers to triglycerides where the fatty acid moiety has an aliphatic tail of about 6 to about 12 carbon atoms. In some embodiments, the fatty acid moiety has an aliphatic tail of 6, 7, 8, 9, 10, 11, or 12 carbon atoms. In further embodiments, the fatty acid aliphatic tails are the same. In other embodiments, the fatty acid aliphatic tails are different. In still further embodiments, the fatty acid has an aliphatic tail of 6 carbon atoms, i.e., the medium chain triglyceride is caproic acid. In yet other embodiments, the fatty acid has an aliphatic tail of about 8 carbon atoms, i.e., the medium chain triglyceride is caprylic acid. In other embodiments, the fatty acid has an aliphatic tail of about 10 carbon atoms, i.e., the medium chain triglyceride is capric acid. In further embodiments, the fatty acid has an aliphatic tail of about 12 carbon atoms, i.e., the medium chain triglyceride is lauric acid.

The medium chain triglyceride is present in the pharmaceutical formulation at about 70 to about 90% (w/w), based on the weight of the formulation. In some embodiments, the pharmaceutical formulations contains about 72 to about 88% (w/w), about 74 to about 86% (w/w), about 76 to about 84% (w/w), about 78 to about 82% (w/w), about 70 to about 85% (w/w), about 70 to about 80% (w/w), about 75 to about 90% (w/w), about 75 to about 85% (w/w), about 75 to about 80% (w/w), about 80 to about 90% (w/w), about 80 to about 85% (w/w), or about 80 to about 90% (w/w) of the medium chain triglyceride. In further embodiments, the pharmaceutical formulations contain about 80 to about 85% (w/w) of the medium chain triglyceride. In other embodiments, the pharmaceutical formulations contain about 70, about 71, about 72, about 73, about 74, about 75, about 76, about 77, about 78, about 79, about 80, about 81, about 82, about 83, about 84, about 85, about 86, about 87, about 88, about 89, or about 90% (w/w) of the medium chain triglyceride. In yet further embodiments, the pharmaceutical formulations contain about 90% (w/w) of the medium chain triglyceride. In still other embodiments, the pharmaceutical formulations contain about 91% (w/w) of the medium chain triglyceride.

In some aspects, the pharmaceutical formulations contain about 1 to about 20% (w/w), of $d_4$-domperidone or a pharmaceutically acceptable salt thereof, about 2 to about 20% (w/w) of the glyceryl stearate and about 70 to about 90% (w/w) of the medium chain triglyceride. In other aspects, the pharmaceutical formulations contain about 5 to about 15% (w/w) of $d_4$-domperidone or a pharmaceutically acceptable salt thereof, about 5 to about 15% (w/w) of the glyceryl stearate, and about 80 to about 85% (w/w) of the medium chain triglyceride. In further aspects, the pharmaceutical formulations contain about 10% (w/w) of the glyceryl stearate and about 90% (w/w) of the medium chain triglyceride.

$D_4$-Domperidone Formulation Containing a Stearoyl Polyoxyl Glyceride, Nonionic Poly(Ethylene Oxide) Polymer, and Medium Chain Triglyceride The present disclosure also provides pharmaceutical formulations comprising $d_4$-domperidone or a pharmaceutically acceptable salt thereof, a stearoyl polyoxyl glyceride, a nonionic poly(ethylene oxide) polymer, and a medium chain triglyceride.

As a first component, the pharmaceutical formulations contain a stearoyl polyoxyl glyceride. The term "stearoyl polyoxyl glyceride" as used herein refers to a mixture of glycerol esters and polyethylene glycol. Typically, the polyethylene glycol has a mean molecular weight (Mn) of about 350 to about 1700. In some embodiments, the polyethylene glycol has a Mn of about 400 to about 1500, about 500 to about 1400, about 600 to about 1300, about 700 to about 1200, about 800 to about 1100, about 400 to about 1300, about 400 to about 1100, about 400 to about 900, about 400 to about 700, about 500 to about 1500, about 700 to about 1500, about 900 to about 1500, about 1100 to about 1500, or about 1300 to about 1500. In other embodiments the polyethylene glycol has a Mn of about 400, about 450, about 500, about 550, about 600, about 650, about 700, about 750, about 800, about 850, about 900, about 950, about 1000, about 1050, about 1100, about 1150, about 1200, about 1250, about 1300, about 1350, about 1400, about 1450, about 1500, about 1550, about 1600, about 1650, or about 1700. In further embodiments, the polyethylene glycol has a Mn of about 1450 to about 1550. In still other embodiments, the mixture of polyethylene glycol and glycerol esters is a GELUCIRE® (available from Gattefosse) such as GELUCIRER® 44/14 reagent (containing mono, di- and triglycerides and PEG-32 (molecular weight of about 1450 to about 1550) mono- and diesters of lauric acid (C12) having a melting range of about 42.5 to about 47.5° C., or critical micelle concentration (CMC) of 72±53 g/mL at about 25° C.), GELUCIRE® 50/13 (containing mono, di- and triglycerides and PEG-32 (Mn of about 1450 to about 1550) mono- and diesters of palmitic (C16) and stearic (C18) acids, a melting range of about 46 to about 51° C., hydrophile-lipophile balance (HLB) of about 13, CMC of about 100 mg/L at about 25° C.), GELUCIRE® 43/01 (containing mono-, di- and triglyceride esters of fatty acids (C8-18), a melting range of about 42 to about 46° C., and/or HLB of about 1), or GELUCIRE® 48/16 (containing PEG-32 (molecular weight of about 1450 to about 1550) esters of fatty acids, a melting range of about 46 to about 50° C., HLB of about 16, and/or CMC of 153±31 mg/L at about 25° C.). In some embodiments, a stearoyl polyoxyl glyceride contains monoesters, diesters, and triesters of glycerol. In other embodiments, a stearoyl polyoxyl glyceride contains monoesters and diesters of polyethylene glycols. In further embodiments, the stearoyl polyoxyl glyceride contains (i) monoesters, diesters, and/or triesters of glycerol and (ii) monoesters and/or diesters of polyethylene glycols. In yet other embodiments, the stearoyl polyoxyl glyceride is a stearoyl polyoxyl-32 glyceride (containing 32 repeating oxyethylene units). In still further embodiments, the stearoyl polyoxyl glyceride is GELUCIRER® 50/13.

The pharmaceutical formulations contain about 3 to about 15% (w/w), based on the weight of the formulation, of the stearoyl polyoxyl glyceride. In some embodiments, the pharmaceutical formulations contain about 4 to about 14% (w/w), about 5 to about 13% (w/w), about 6 to about 12% (w/w), about 7 to about 11% (w/w), about 8 to about 10% (w/w), about 5 to about 12% (w/w), about 5 to about 10% (w/w), or about 6 to about 8% (w/w) of the stearoyl polyoxyl glyceride. In other embodiments, the pharmaceutical formulations contain about 3, about 4, about 5, about 6, about 7, about 8, about 9, about 10, about 11, about 12, about 13, about 14, or about 15% (w/w) of the stearoyl polyoxyl glyceride. In further embodiments, the pharmaceutical formulations contain about 7% (w/w) of the stearoyl polyoxyl glyceride.

The pharmaceutical formulation also contains a nonionic poly(ethylene oxide) polymer. The term "nonionic poly(ethylene oxide)" as used herein refers to a polymer having the following structure that is a liquid at room temperature.

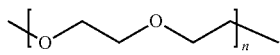

In some embodiments, n is about 2,000 to about 100,000. In other embodiments, n is about 2,000 to about 90,000; about 2,000 to about 80,000; about 2,000 to about 60,000; about 2,000 to about 40,000; about 2,000 to about 20,000; about 2,000 to about 10,000; about 2,000 to about 8,000; about 2,000 to about 6,000; about 2,000 to about 4,000; about 4,000 to about 100,000; about 8,000 to about 100,000; about 10,000 to about 100,000; about 20,000 to about 100,000; about 40,000 to about 100,000; about 60,000 to about 100,000; about 80,000 to about 100,000; about 4,000 to about 80,000; about 6,000 to about 60,000; about 8,000 to about 40,000; about 10,000 to about 20,000. In further embodiments, n is about 2,000; 3,000; 4,000; 5,000; 6,000; 7,000; 8,000; 9,000; 10,000; 15,000; 20,000; 25,000; 30,000; 35,000; 40,000; 45,000; 50,000; 55,000; 60,000; 65,000; 70,000; 75,000; 80,000; 85,000; 90,000, 95,000; or 100,000.

In some embodiments, the nonionic poly(ethylene oxide) polymer has a molecular weight ($M_w$) of about 400,000 to about 8,000,000. In other embodiments, the nonionic poly(ethylene oxide) has a $M_w$ of about 500,000 to about 8,000,000, about 600,000 to about 8,000,000, about 700,000 to about 8,000,000, about 800,000 to about 8,000,000, about 900,000 to about 8,000,000, about 1,000,000 to about 8,000,000, about 2,000,000 to about 8,000,000, about 3,000,000 to about 8,000,000, about 4,000,000 to about 8,000,000, about 5,000,000 to about 8,000,000, about 6,000,000 to about 8,000,000. In further embodiments, the nonionic poly(ethylene oxide) polymer has a $M_w$ of about 500,000, about 600,000, about 700,000, about 800,000, about 900,000, about 1,000,000, about 2,000,000, about 3,000,000, about 4,000,000, about 5,000,000, about 6,000,000, about 7,000,000, or about 8,000,000. In yet other embodiments, the nonionic poly(ethylene oxide) has a $M_w$ of about 7,000,000. In yet other embodiments, the nonionic poly(ethylene oxide) is polyethylene oxide 303. In still further embodiments, the nonionic poly(ethylene oxide) is POLYOX™ WSR 303.

The nonionic poly(ethylene oxide) polymer is present in the pharmaceutical formulations at about 5 to about 40% (w/w), based on the weight of the formulation. In some embodiments, the pharmaceutical formulations contain about 10 to about 35% (w/w), about 15 to about 30% (w/w), about 20 to about 25% (w/w), about 5 to about 35% (w/w), about 5 to about 30% (w/w), about 5 to about 25% (w/w), about 5 to about 20% (w/w), about 5 to about 15% (w/w), about 5 to about 10% (w/w), about 10 to about 40% (w/w), about 10 to about 30% (w/w), about 10 to about 20% (w/w), about 10 to about 25% (w/w), about 5 to about 35% (w/w), about 5 to about 30% (w/w), about 5 to about 25% (w/w), or about 5 to about 20% (w/w) of the nonionic poly(ethylene oxide) polymer. In other embodiments, the pharmaceutical formulations contain about 12 to about 25% (w/w) of the nonionic poly(ethylene oxide) polymer. In other embodiments, the pharmaceutical formulations contain about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40% (w/w) of the nonionic poly(ethylene oxide) polymer. In further embodiments, the pharmaceutical formulations contain about 19% (w/w) of the nonionic poly(ethylene oxide) polymer.

The pharmaceutical formulations further contain a medium chain triglyceride as defined above. In some embodiments, the fatty acid moiety has an aliphatic tail of about 6, 7, 8, 9, 10, 11, or 12 carbon atoms. In further embodiments, the medium chain triglyceride is caproic acid. In other embodiments, the medium chain triglyceride is caprylic acid. In yet further embodiments, the medium chain triglyceride is capric acid. In still other embodiments, the medium chain triglyceride is lauric acid.

The medium chain triglyceride is present in the pharmaceutical formulation at about 40 to about 80% (w/w), based on the weight of the formulation. In some embodiments, the pharmaceutical formulations contains about 45 to about 75% (w/w), about 50 to about 70% (w/w), about 55 to about 65% (w/w), about 50 to about 80% (w/w), about 60 to about 80% (w/w), about 70 to about 80% (w/w), about 40 to about 70% (w/w), about 40 to about 60% (w/w), or about 50 to about 70% (w/w) of the medium chain triglyceride. In further embodiments, the pharmaceutical formulations contain about 50 to about 68% (w/w) of the medium chain triglyceride. In other embodiments, the pharmaceutical formulations contain about 40, about 41, about 42, about 43, about 44, about 45, about 46, about 47, about 48, about 49, about 50, about 51, about 52, about 53, about 54, about 55, about 56, about 57, about 58, about 59, about 60, about 61, about 62, about 63, about 64, about 65, about 66, about 67, about 68, about 69, about 70, about 71, about 72, about 73, about 74, about 75, about 76, about 77, about 78, about 79, or about 80% (w/w) of the medium chain triglyceride. In still further embodiments, the pharmaceutical formulations contain about 64% (w/w) of the medium chain triglyceride.

In some aspects, the pharmaceutical formulations contain about 1 to about 20% (w/w), based on the weight of the formulation, of $d_4$-domperidone or a pharmaceutically acceptable salt thereof, about 3 to about 15% (w/w) stearoyl polyoxyl glyceride, about 5 to about 40% (w/w) of the nonionic poly(ethylene oxide) polymer, and about 40 to about 80% (w/w) of the medium chain triglyceride. In other aspects, the pharmaceutical formulations contain about 5 to about 10% (w/w), based on the weight of the formulation, of $d_4$-domperidone or a pharmaceutically acceptable salt thereof, about 5 to about 10% (w/w) stearoyl polyoxyl glyceride, about 12 to about 25% (w/w) of the nonionic poly(ethylene oxide) polymer, and about 50 to about 68% (w/w) of the medium chain triglyceride.

D$_4$-Domperidone Formulation Containing a Nonionic Poly (Ethylene Oxide) Polymer and Polyethylene Glycol In further embodiments, the present disclosure provides pharmaceutical formulations comprising d$_4$-domperidone or a pharmaceutically acceptable salt thereof, a nonionic poly (ethylene oxide) polymer, and a polyethylene glycol.

As one component, the pharmaceutical formulations contain a nonionic poly(ethylene oxide) polymer as defined above. In some embodiments, the nonionic poly(ethylene oxide) is polyethylene oxide 303. In further embodiments, the nonionic poly(ethylene oxide) is POLYOX™ WSR 303.

The nonionic poly(ethylene oxide) polymer is present in the pharmaceutical formulations at about 5 to about 30% (w/w), based on the weight of the formulation. In some embodiments, the pharmaceutical formulations contain about 10 to about 30% (w/w), about 15 to about 30% (w/w), about 20 to about 25% (w/w), about 5 to about 30% (w/w), about 5 to about 25% (w/w), about 5 to about 20% (w/w), about 5 to about 15% (w/w), about 5 to about 10% (w/w), about 10 to about 20% (w/w), about 10 to about 25% (w/w), or about 5 to about 20% (w/w) of the nonionic poly(ethylene oxide) polymer. In other embodiments, the pharmaceutical formulations contain about 10 to about 20% (w/w) of the nonionic poly(ethylene oxide) polymer. In further embodiments, the pharmaceutical formulations contain about 5, about 6, about 7, about 8, about 9, about 10, about 11, about 12, about 13, about 14, about 15, about 16, about 17, about 18, about 19, about 20, about 21, about 22, about 23, about 24, about 25, about 26, about 27, about 28, about 29, or about 30% (w/w) of the nonionic poly(ethylene oxide) polymer. In still other embodiments, the pharmaceutical formulations contain about 15% (w/w) of the nonionic poly(ethylene oxide) polymer.

The pharmaceutical formulations also contain polyethylene glycol. The term "polyethylene glycol" as used herein refers to chemical compound having the following structure that is a liquid at room temperature, wherein m is about 7 to about 20.

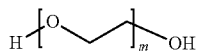

In some embodiments, m is about 7 to about 15, about 7 to about 10, about 8 to about 15, about 8 to about 10, about 9 to about 15, or about 9 to about 13. In other embodiments, m is about m is about 8 to about 9. In further embodiments, m is about 7, 8, 9, 10, 11, 12, 13, 14, 15, 16, 17, 18, 19, or about 20. In yet further embodiments, m is about 8. In still other embodiments, m is about 9. The polyethylene glycol has also a molecular weight (M$_w$) of about 300 to about 1,000. In some embodiments, the polyethylene glycol has a M$_w$ of about 400 to about 900, about 500 to about 800, about 600 to about 700, about 300 to about 900, about 300 to about 800, about 300 to about 700, about 300 to about 600, about 300 to about 500, about 400 to about 1,000, about 500 to about 1,000, about 600 to about 1,000, about 700 to about 1,000, about 800 to about 1,000, or about 900 to about 1,000. In further embodiments, the polyethylene glycol has a M$_w$ of about 400, about 450, about 500, about 550, 6 about 00, about 650, about 700, about 750, about 800, about 850, about 900, about 950, or about 1,000. In yet other embodiments, the polyethylene glycol has a M$_w$ of about 400. In yet other embodiments, the polyethylene glycol is polyethylene glycol 400.

The pharmaceutical formulations contain about 70 to about 90% (w/w), based on the weight of the formulation, of the polyethylene glycol. In some embodiments, the pharmaceutical formulations contain about 70 to about 85% (w/w), about 70 to about 80% (w/w), about 70 to about 75% (w/w), about 75 to about 90% (w/w), about 80 to about 90% (w/w), or about 85 to about 90% (w/w) of the polyethylene glycol. In other embodiments, the pharmaceutical formulations contain about 70, about 71, about 72, about 73, about 74, about 75, about 76, about 77, about 78, about 79, about 80, about 81, about 82, about 83, about 84, about 85, about 86, about 87, about 88, about 89, or about 90% (w/w). In further embodiments, the pharmaceutical formulations contain about 75% (w/w) of the polyethylene glycol.

In some aspects, the pharmaceutical formulations contain about 1 to about 20% (w/w), based on the weight of the formulation, of d$_4$-domperidone or a pharmaceutically acceptable salt thereof, about 5 to about 30% (w/w) of the nonionic poly(ethylene oxide) polymer and about 70 to about 90% (w/w) of the polyethylene glycol. In other aspects, the pharmaceutical formulations contain about 5 to about 10% (w/w), based on the weight of the formulation, of d$_4$-domperidone or a pharmaceutically acceptable salt thereof, about 10 to about 20% (w/w) of the nonionic poly(ethylene oxide) polymer and about 70 to about 80% (w/w) of the polyethylene glycol.

The pharmaceutical formulations described herein may also contain one or more antioxidants. In some embodiments, the pharmaceutical formulations contain one antioxidant. In other embodiments, the pharmaceutical formulations contain two antioxidants. In further embodiments, the pharmaceutical formulations contain three antioxidants. The antioxidant may be selected by those skilled in the art. In some embodiments, the antioxidant is ascorbic acid, ascorbyl palmitate, butylated hydroxyanisole (BHA), butylated hydroxytoluene (BHT), propyl gallate, potassium metabisulfite, sodium metabisulfite, sodium thiosulfate, or vitamin E. In other embodiments, the antioxidant is BHA. In further embodiments, the antioxidant is BHT. In still other embodiments, the antioxidant is BHA and BHT.

The total amount of antioxidant in the pharmaceutical formulation is about 0.01 to about 0.5% (w/w), of the total weight of the formulation. In some embodiments, amount of one or more antioxidant in the pharmaceutical formulation is about 0.01 to about 0.4, about 0.01 to about 0.3, about 0.01 to about 0.2, about 0.01 to about 0.1, about 0.01 to about 0.05, about 0.05 to about 0.4, about 0.05 to about 0.3, about 0.05 to about 0.2, about 0.05 to about 0.1% (w/w). In other embodiments, the pharmaceutical formulations contain about 0.01, about 0.02, about 0.03, about 0.04, about 0.05, about 0.06, about 0.07, about 0.08, about 0.09, about 0.10, about 0.11, about 0.12, about 0.013, about 0.014, about 0.015, about 0.016, about 0.017, about 0.018, about 0.019, about 0.20, about 0.21, about 0.22, about 0.23, about 0.24, about 0.25, about 0.26, about 0.27, about 0.28, about 0.29, about 0.30, about 0.31, about 0.32, about 0.33, about 0.34, about 0.35, about 0.36, about 0.37, about 0.38, about 0.39, about 0.40, about 0.41, about 0.42, about 0.43, about 0.44, about 0.45, about 0.46, about 0.47, about 0.48, about 0.49, or about 0.50% (w/w). In further embodiments, the pharmaceutical formulations contain about 0.1% (w/w) of the antioxidant. In still other embodiments, the pharmaceutical formulations contain about 0.05% (w/w) of the antioxidant. In yet further embodiments, the pharmaceutical formulations contain about 0.15% (w/w) of the antioxidant. In other embodiments, the pharmaceutical formulations contain about 0.1% (w/w) BHA. In further embodiments, the pharmaceutical formulations contain about 0.05% (w/w) of BHT. In yet other embodiments, the pharmaceutical formulations contain about 0.1% (w/w) BHA and 0.05% (w/w) of BHT.

The $d_4$-domperidone formulations described herein are useful in a variety of treatment methods including, without limitation, methods for treating a disorder that is gastroparesis, nausea apart from gastroparesis, vomiting apart from gastroparesis, nausea associated with gastroparesis, vomiting associated with gastroparesis, gastroesophageal reflux disease, insufficient lactation, nausea and/or vomiting associated with chemotherapy, or a combination thereof. The methods include administering to the patient a pharmaceutical formulation described herein. In some embodiments, the methods are useful for treating gastroparesis. In other embodiments, the methods are useful for treating nausea apart from gastroparesis. In further embodiments, the methods are useful for treating vomiting apart from gastroparesis. In yet other embodiments, the methods are useful for treating nausea associated with gastroparesis. In still further embodiments, the methods are useful for treating vomiting associated with gastroparesis. In other embodiments the methods are useful for treating gastroesophageal reflux disease. In further embodiments, the methods are useful for treating insufficient lactation. In still other embodiments, the methods are useful for treating nausea and/or vomiting associated with chemotherapy.

The pharmaceutical formulations may be administered by any route that would be acceptable for administered of non-deuterated domperidone. In some embodiments, the pharmaceutical formulations the administration is oral, transdermal, parenteral, or a combination thereof. In further embodiments, administration is oral.

The pharmaceutical formulations may be formulated for administration in solid or liquid forms. In some embodiments, the pharmaceutical formulations are formulated in the form of a tablet, caplet, capsule, powder, softgel, suspension or liquid, or a combination thereof. In other embodiments, the pharmaceutical formulations are formulated in the form of a tablet. In further embodiments, the pharmaceutical formulations are formulated in the form of a caplet. In yet other embodiments, the pharmaceutical formulations are formulated in the form of a capsule. In still further embodiments, the pharmaceutical formulations are formulated in the form of a powder. In other embodiments, the pharmaceutical formulations are formulated in the form of a softgel. In further embodiments, the pharmaceutical formulations are formulated in the form of suspension. In yet other embodiments, the pharmaceutical formulations are formulated in the form of a liquid.

The following Examples are provided to illustrate some of the concepts described within this disclosure. While each Example is considered to provide specific individual embodiments of formulations, methods of preparation and use, none of the Examples should be considered to limit the more general embodiments described herein.

In the following examples, efforts have been made to ensure accuracy with respect to numbers used (e.g. amounts, temperature, etc.) but some experimental error and deviation should be accounted for. Unless indicated otherwise, temperature is in degrees C.; $C_{max}$=maximum plasma concentration; $t_{max}$=time of maximum plasma concentration; $MRT_{last}$=mean residence time, calculated to the last observable time point; $AUC_{last}$=area under the curve, calculated to the last observable time point.

EXAMPLES

Example 1: Formulation Preparation

Five formulations, i.e., A-E, containing $d_4$-domperidone were prepared by combining the components identified in Table 1.

TABLE 1

| Ingredient | Formulation (%) | | | | |
|---|---|---|---|---|---|
| | A | B | C | D Tablet | E |
| $d_4$-Domeridone | 10.0 | 9.6 | 10.0 | 2.5 | 4.6 |
| PRECIROL ® ATO 5 | 9.75 | 0 | 0 | 0 | 0 |
| GELUCIRE ® 50/13 | 0 | 7.2 | 0 | 0 | 0 |
| CREMPHOR ® RH40 | 0 | 0 | 0 | 0 | 13.9 |
| POLYOX ™ WSR 303 | 0 | 19.4 | 15.0 | 20.0 | 0 |
| PEG 400 | 0 | 0 | 75.0 | 0 | 6.9 |
| AVICEL ® PH 102 | 0 | 0 | 0 | 77.5 | 0 |
| COMPRITOL ® ATO 888 | 0 | 0 | 0 | 0 | 10.0 |
| Oleic acid | 0 | 0 | 0 | 0 | 64.6 |
| MCT | 80.25 | 63.8 | 0 | 0 | 0 |
| Fill/Tablet Weight (mg) | 100.0 | 104.0 | 100.0 | 400.0 | 217.0 |

Formulations A-C and E were formulated as liquid or semi solid and filled into capsules and formulation D was compressed to form a tablet using a single station carver press.

Example 2: Dog PK Study with $d_4$-Domperidone Formulations

In this study, the oral exposure of domperidone and $d_4$-domperidone was evaluated in male Beagle dogs following oral administration of various capsule or tablet formulations of $d_4$-domperidone as shown in Example 1 and a suspension formulation of domperidone prepared by combining 0.5% METHOCEL™ cellulose ether, 0.2% polysorbate 80 (TWEEN® 80), and 0.72% lactic acid.

Each $d_4$-domperidone formulation was dosed orally (PO) at 10 mg/dog, and the domperidone formulation was dosed orally at 1 mg/kg. Blood samples were collected up to 24 hours post-dose and plasma concentrations of domperidone or domperidone-$d_4$ were determined by LCMS/MS. Pharmacokinetic parameters were determined using Phoenix WinNonlin (v8.0) software. Average plasma concentrations and pharmacokinetic parameters are summarized in Table 2.

TABLE 2

| Measurement | Formulation | | | | | |
|---|---|---|---|---|---|---|
| | A | B | C | D | E | F |
| Weight Dosed (mg) | 10 | 10 | 10 | 10 | 10 | 10 |
| Dose (mg/kg) | 0.8 | 0.9 | 0.9 | 0.8 | 0.9 | 1 |
| $C_{max}$ (ng/mL) | 23.7 | 38.5 | 55.1 | 7.09 | 165 | 100 |
| $t_{max}$ (hr) | 3 | 3 | 2 | 3 | 0.8 | 1 |
| $MRT_{last}$ (hr) | 7.9 | 6.46 | 4.64 | 10.2 | 3.1 | 3.34 |
| $AUC_{last}$ (hr ng/mL) | 332 | 415 | 359 | 130 | 641 | 475 |

Figure 2:
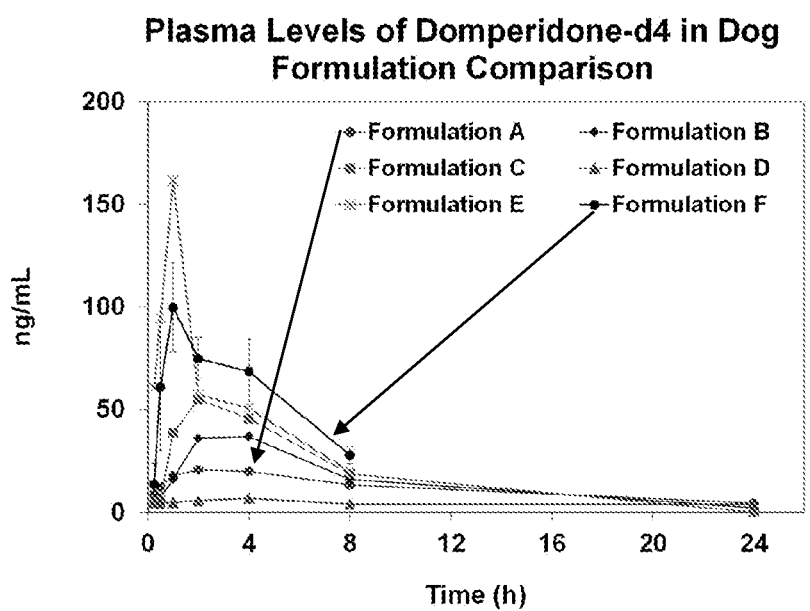
FIG. 2 is an expanded section of FIG. 1.
Figure 3:
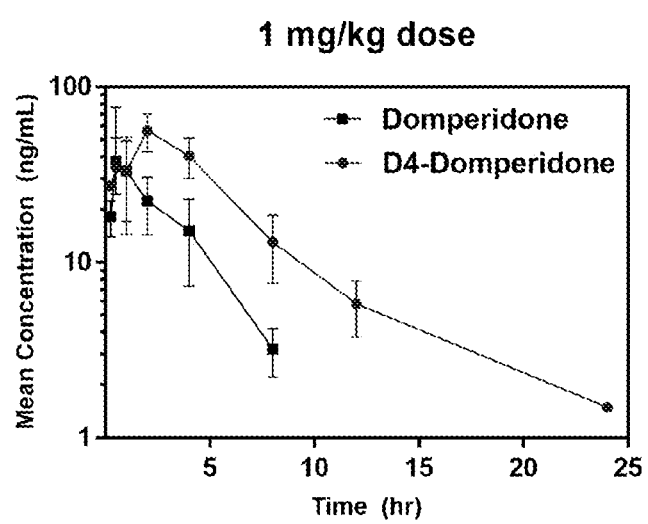
FIG. 3 is a line graph showing the mean concentration of domperidone or $d_4$-domperidone after a 1 mg/kg dog as described in Example 3.
Figure 4:
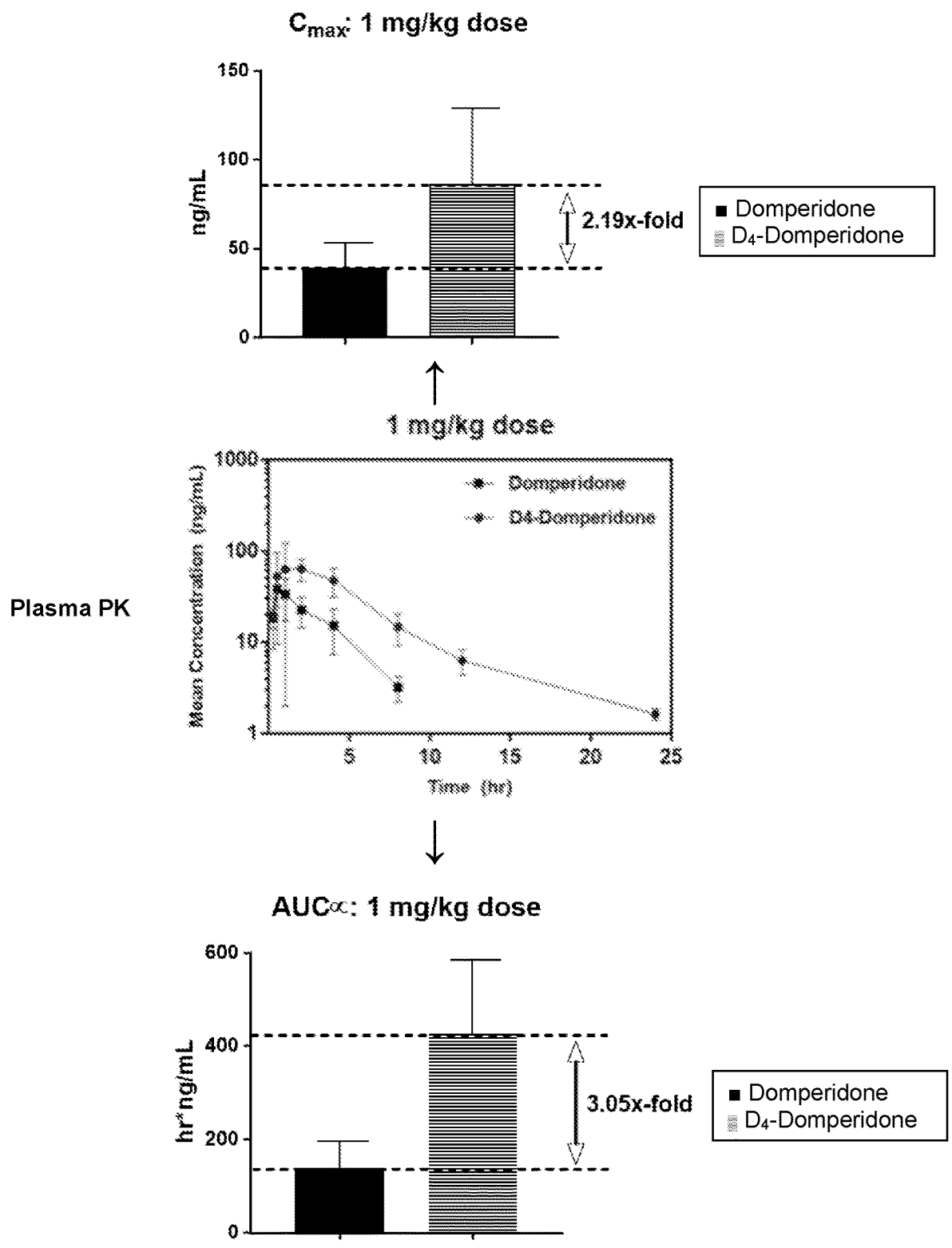
FIG. 4 is an extension of FIG. 3 which further illustrates the $C_{max}$ and AUC of domperidone and $d_4$-domperidone in a bar graph format.

Table 2 provides the measured $C_{max}$, $t_{max}$, $MRT_{last}$, and $AUC_{last}$ and illustrate that Formulations A-C showed a significant reduction in $C_{max}$, a longer MRT and comparable AUC as compared to Formulation F. Formulation D showed much lower $C_{max}$ and AUC and a much higher MRT compared to Formulation F. However, Formulation E showed a much higher $C_{max}$ and AUC compared to Formulation F. See, FIGS. 1-2.

Example 3: Dog Cardiovascular Study Showing $QT_c$ Minimizing Using $d_4$-Domperidone The potential cardiovascular effects of non-deuterated domperidone and $d_4$-domperidone were evaluated in beagle dogs. Oral suspensions were administered via gavage for comparison purposes.

In one study the non-deuterated domperidone was evaluated using a formulation of 0.5% METHOCEL™ (hydroxy propyl methylcellulose), 0.2% polysorbate 80 (TWEEN® 80), and 0.72% lactic acid in sterile water for injection. USP. The $d_4$-domperidone formulation was Formulation A, Example 1. For the non-deuterated domperidone, formulations were prepared by mixing the appropriate amount of vehicle with the appropriate amount of non-deuterated domperidone to achieve a nominal concentration of 0.2, 1 and 4 mg/mL Beagle dogs were dosed at a volume of 5 mL/kg by gavage to provide doses of 1, 5 and 20 mg/kg and a vehicle control. See Table 3. One animal/treatment was dosed each week with at least a 2-day washout period between administrations until each animal received all treatments. The same 4 animals received treatments according to a Latin square design. Systolic blood pressure, diastolic blood pressure, heart rate and Lead II electrocardiogram were continuously recorded. The measurements started 1.5 hrs prior to the dose administration and all parameters were continuously recorded 24 hrs following the end of dosing of the last animal.

TABLE 3

| Treatment Number | Route of Administration | Dose Level (mg/kg) | Number of Male Animals |
|---|---|---|---|
| 1 | Gavage | 0 | 4 |
| 2 | Gavage | 1 | 4 |
| 3 | Gavage | 5 | 4 |
| 4 | Gavage | 20 | 4 |

The individual animal correction ($QT_cVdW$) was calculated using Van de Water formula. When corrected with the Van de Water formula, $QT_cVdW$ was increased up to 23 and 21 msec at doses of 5 and 20 mg/kg, respectively after dosing with the non-deuterated domperidone.

Table 4 indicates the change (% and ms) from the appropriate time-matched control for each non-deuterated domperidone treatment.

TABLE 4

| | $QT_c$ Percent Change | | | |
|---|---|---|---|---|
| Treatment | Segment 1 (0-6 hours) | Segment 2 (7-24 hours) | Maximum % Change/Time | Duration of Effect (hours post dose) |
| 1 mg/kg | +6% (13 ms) | +2% (4 ms) | 6% (2 hours) | 1-2 |
| 5 mg/kg | +11% (23 ms) | +7% (15 ms) | 11% (2 hours)* | 0.5-6 |
| 20 mg/kg | +10% (21 ms) | +7% (16 ms) | 10% (2 hours)* | 0.5-4 | ms—milliseconds
*statistically significant

For the deuterated domperidone, male dogs were, independently, orally administered the vehicle (0 mg; capsule) and capsules containing $d_4$-domperidone at dose levels of 20, 110, or 385 mg. One animal/treatment was dosed each week with at least a 3-day washout period between administrations until each animal received all treatments. See, Table 5. The same 5 animals received all treatments according to a Latin square design with at least a 3-day washout between treatments. Body temperature, blood pressure, heart rate, and the electrocardiogram (ECG) were monitored continuously for at least 2 hours prior to dosing and for at least 24 hours post dose.

TABLE 5

| Treatment Number | Route of Administration | Dose Level | Number of Male Animals |
|---|---|---|---|
| 1 | Capsule | 0 mg | 5 |
| 2 | Capsule | 20 mg | 5 |
| 3 | Capsule | 110 mg | 5 |
| 4 | Capsule | 385 mg | 5 |

Three days prior to the study, the animals were continuously monitored for at least 24 hours for body temperature and cardiovascular endpoints while on the stock colony (10 days prior to the first administration). These data were collected in 1-minute intervals. The first 24 hours of the data were used in the calculation of the QTc interval. Body temperature, blood pressure, heart rate (derived from blood pressure and ECG), and the ECG were monitored continuously from at least 2 hours predose until at least 24 hours post dose. Data were collected and analyzed in 1-minute intervals and are reported in 15-minute intervals. The $QT_c$ interval was calculated using a procedure based on the method described by Spence ("The heart rate corrected QT interval of conscious beagle dogs: a formula based on analysis of covariance," Toxicol Sci, 1998; 45:247 258) and modified by Miyazaki and Tagawa ("Rate-correction technique for QT interval in long term telemetry ECG recording in beagle dogs," Exp. Anim., 2002; 51:465 475). Blood samples (approximately 1 mL) were collected via jugular vein and 8 and 24 hours post dose to confirm exposure.

There was a time-dependent increase in $QT_c$ interval following the 110 mg and 385 mg, treatments which were of a similar magnitude between treatments. Individual time intervals from 9 to 20 hours following the 110 mg and 385 mg treatments achieved statistical significance with a maximum increase of up to 13% (30 ms) compared with the time-matched vehicle treatment. Table 6 indicates the change (% and ms) from the appropriate time-matched control for each $d_4$-domperidone treatment.

TABLE 6

| | $QT_c$ Percent Change | | | |
|---|---|---|---|---|
| Treatment | Segment 1 (0-6 hours) | Segment 2 (7-24 hours) | Maximum % Change/Time | Duration of Effect (hours post dose) |
| 20 mg | +1% (3 ms) | +0% (1 ms) | 4% (3.5 hours) | 1.5-12 |
| 110 mg | +5% (12 ms) | +1% (2 ms) | 10% (5 hours)* | 0.5-12 |
| 385 mg | +8% (17 ms) | +6% (13 ms) | 13% (6 hours)* | 0.5-24+ | ms—milliseconds
*statistically significant

Figure 9:
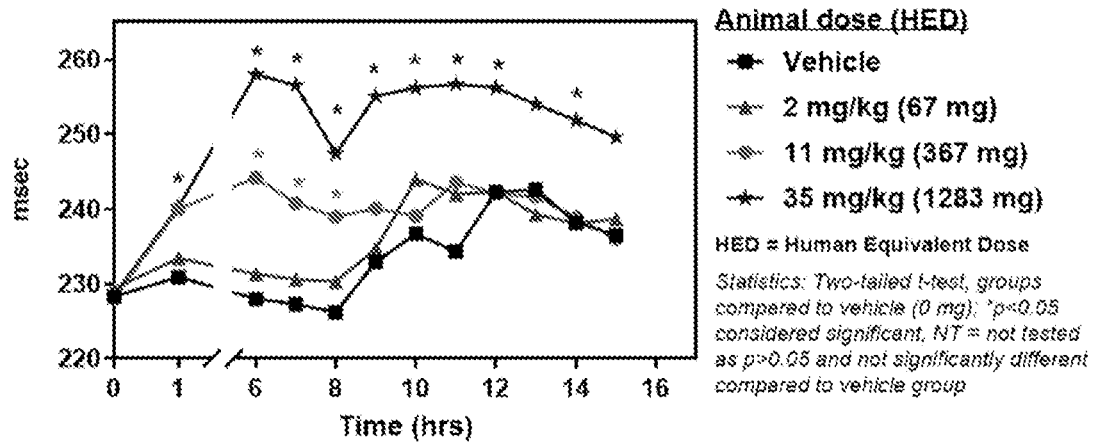
FIG. 9 is a line graph showing the corrected $QT_c$—absolute values for the $d_4$-domperidone samples of Example 3.
Figure 10:
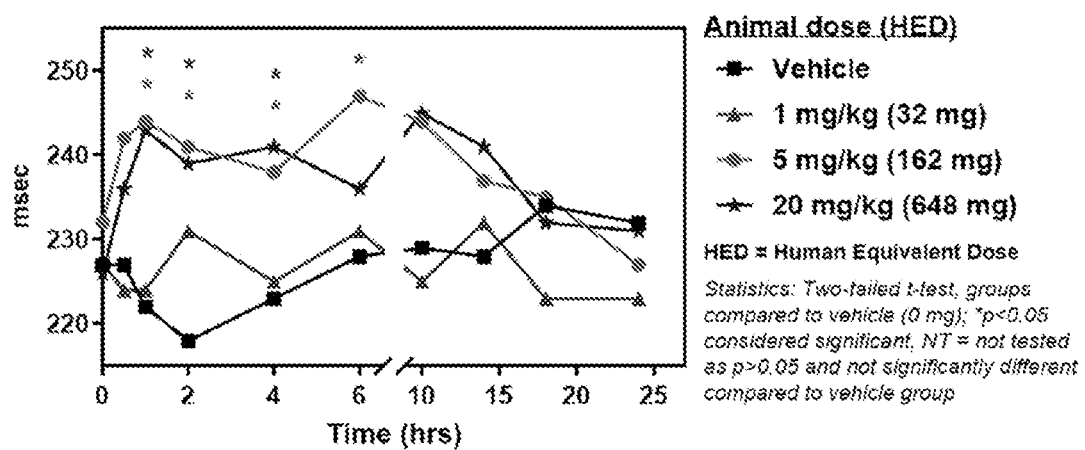
FIG. 10 is a line graph showing the corrected $QT_c$ values—absolute for the non-deuterated domperidone samples of Example 3.
Figure 11:
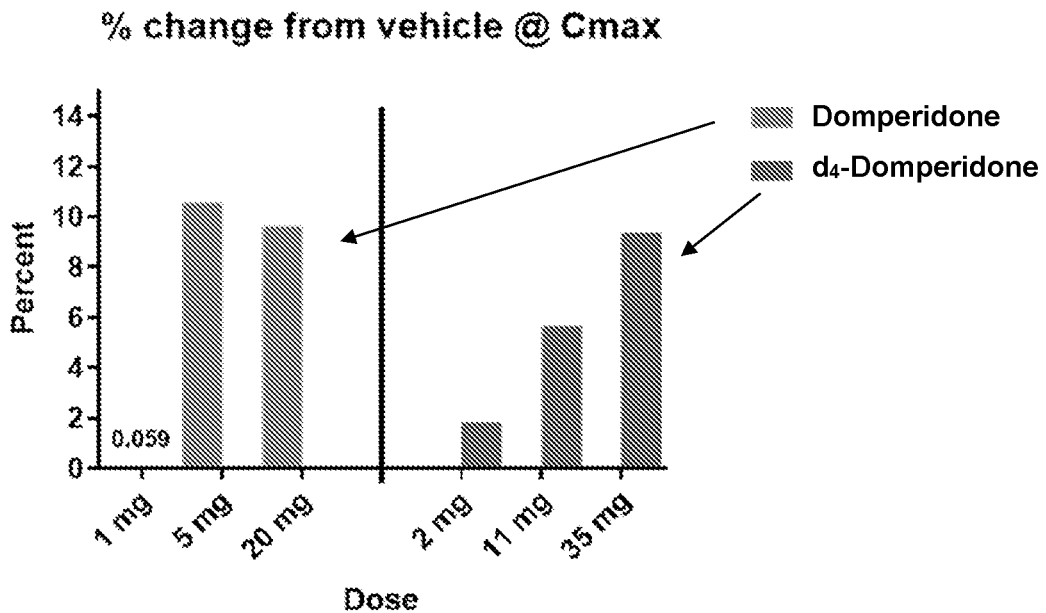
FIG. 11 is a bar graph showing the $C_{max}$% change from the vehicle for the $d_4$-domperidone and non-deuterated domperidone samples of Example 3.
Figure 12:
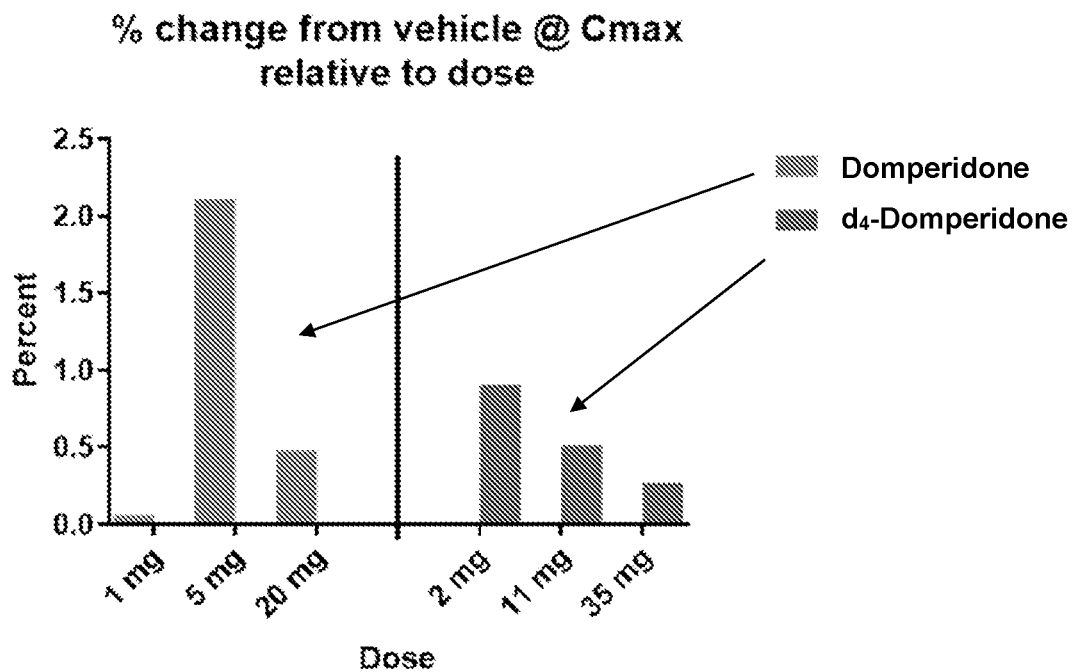
FIG. 12 is a bar graph showing the $C_{max}$% change from the vehicle relative to dose for the $d_4$-domperidone and non-deuterated domperidone samples of Example 3.

FIGS. 9 and 10 illustrate the effect of different doses of $d_4$-domperidone and non-deuterated domperidone on $QT_c$ change. The graphs demonstrate that at lower doses of the non-deuterated formulation there is a greater effect on $QT_c$ change as compared to the higher doses of the deuterated formulation. This is also graphically represented in FIGS. 11 and 12 which shows the effect of $QT_c$ change at the maximal plasma concentration.

Example 4: Comparison of PK Parameters for Suspension Formulations of $d_4$-Domperidone and Domperidone The $C_{max}$ and AUC values of domperidone and $d_4$-domperidone dosed at different doses in dogs were compared. The data for non-deuterated domperidone was obtained as described in Heykants, "On the pharmacokinetics of domperidone in animals and man I. Plasma levels of domperidone in rats and dogs. Age related absorption and passage through the blood brain barrier in rats," European J. of Drug Metabolism and Pharmacokinetics, 1981, 6(1):27-36, which is hereby incorporated by reference, where dogs were dosed capsules containing different amounts of domperidone.

The $d_4$-domperidone suspension formulation was prepared and contained 0.5% METHOCEL™, 0.1% polysorbate 80 and 0.72% lactic acid. The $d_4$-domperidone suspension was then administered to dogs as described in Example 2 or 3 at the different doses shown in Table 7.

TABLE 7

| Dose (mg/kg) | $d_4$-Domperidone Suspension $C_{max}$ | Domperidone Suspension | $D_4$-Domperidone Suspension AUC | Domperidone Suspension |
|---|---|---|---|---|
| 2.5 | — | 94 | — | 700 |
| 3 | 356 | — | 1440 | — |
| 10 | 1570 | 322 | 6760 | 2600 |
| 40 | 5610 | 975 | 34200 | 8900 |

Figure 8:
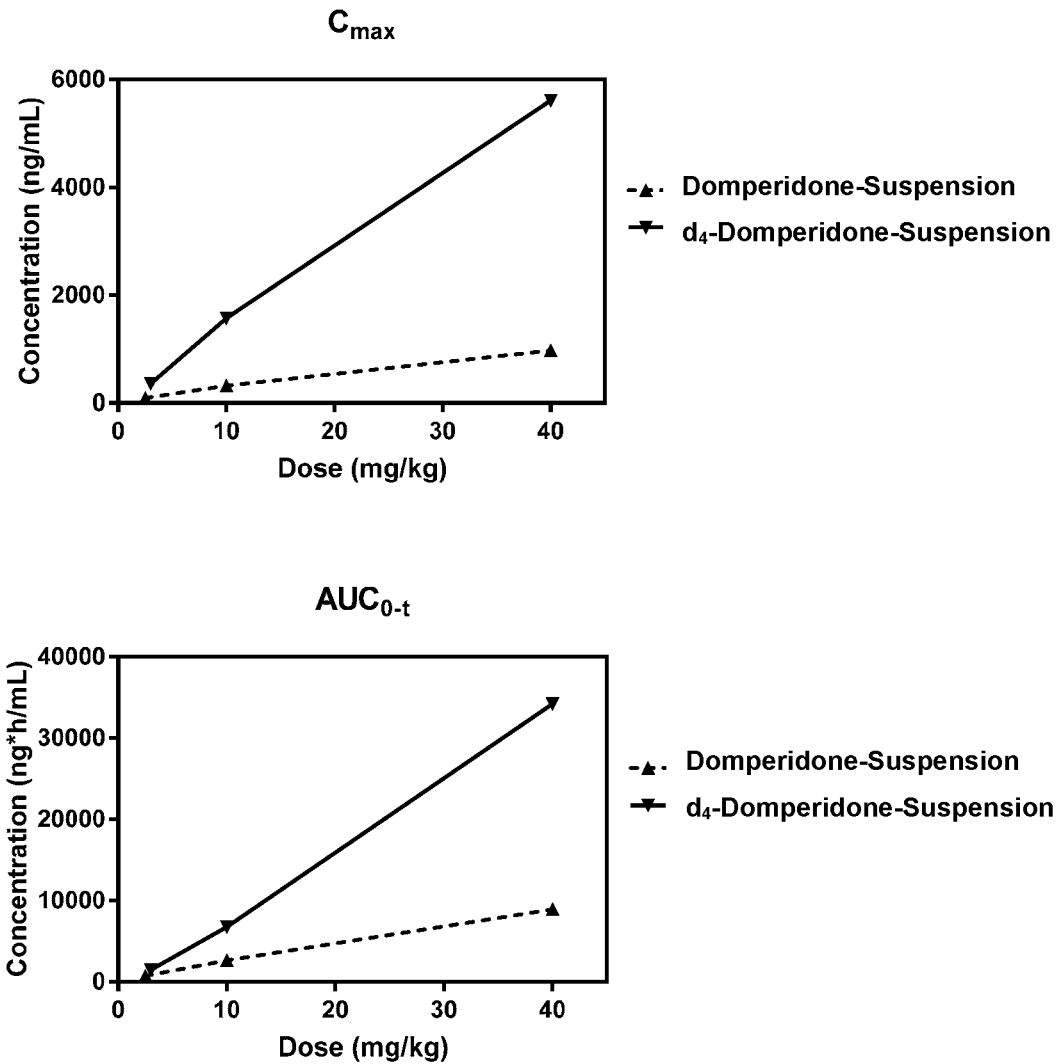
FIG. 8 is a line graph showing the $C_{max}$ and AUC for suspension formulations containing $d_4$-domperidone and domperidone.

The data as shown in Table 7 and FIG. 8 show that $d_4$-domperidone provides a significantly higher bioavailability, including a higher $C_{max}$ (4 to 5 fold) and AUC (2 to 4 fold) compared to domperidone.

Example 5: Dog PK Study for Blunting $C_{max}$

In this study, the oral exposure of domperidone and $d_4$-domperidone was evaluated in male Beagle dogs following oral administration of capsules independently containing Formulations A and B of $d_4$-domperidone of Example 1and a suspension formulation of domperidone prepared by combining 0.5% METHOCEL™ cellulose ether, 0.2% polysorbate 80 (TWEEN® 80), and 0.72% lactic acid. The compositions of the $d_4$-domperidone formulations (A and B) are repeated in Table 8.

TABLE 8

| Ingredient | Amount (%) |
|---|---|
| Formulation A | |
| $d_4$-domperidone | 10.0 |
| PRECIROL ® ATO 5 | 9.75 |
| Medium Chain Triglycerides | 80.25 |
| Total | 100.0 |
| Formulation B | |
| $d_4$-domperidone | 9.6 |
| GELUCIRE ® 50/13 | 7.2 |
| POLYOX™ WSR 303 | 19.4 |
| Medium Chain Triglycerides | 63.8 |
| Total | 100.0 |

The $d_4$-domperidone formulation was dosed orally (PO) at 10 mg/dog and the domperidone formulation was dosed orally at 1 mg/kg. Blood samples were collected up to 24 hours post-dose and plasma concentrations of domperidone or $d_4$-domperidone were determined by LCMS/MS. Pharmacokinetic parameters were determined using Phoenix WinNonlin (v8.0) software. Average plasma concentrations and pharmacokinetic parameters are summarized in Table 9.

TABLE 9

| | Formulation A | Formulation B | Formulation F (domperidone) |
|---|---|---|---|
| Weight Dosed (mg) | 10 | 10 | 10 |
| Dose (mg/kg)[1] | 0.8 | 0.9 | 1 |
| $C_{max}$ (ng/mL) | 23.7 | 38.5 | 39.2 |
| $t_{max}$ (hr) | 3 | 3 | 0.67 |
| $MRT_{last}$ (hr) | 7.9 | 6.46 | 2.57 |
| $AUC_{last}$ (hr · ng/mL) | 350[1] | 415[1] | 129 |

[1]dose normalized to 1 mg/kg

Figure 5:
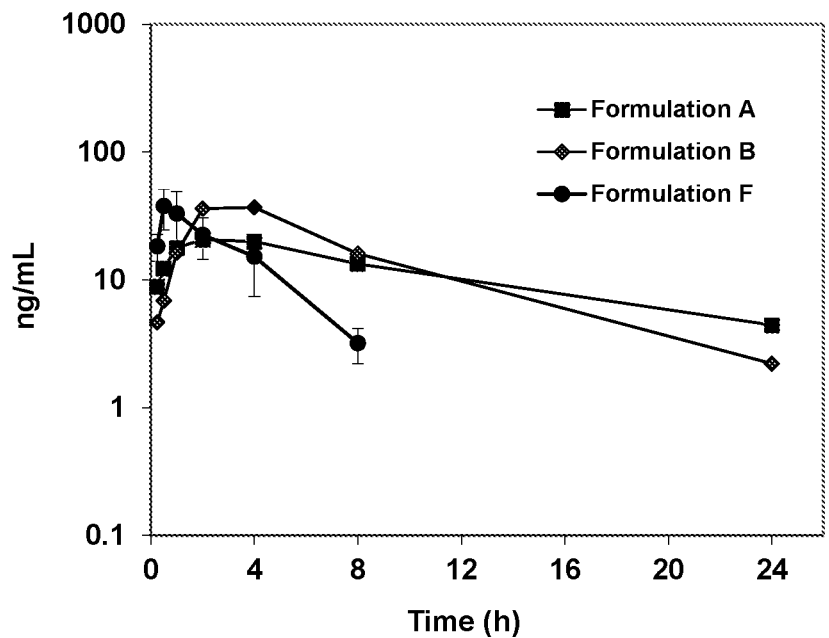
FIG. 5 is a line graph comparing the plasma levels of $d_4$-domperidone after administration of Formulation A, B, or F to a dog as described in Example 4.

See, FIG. 5. These data illustrate that Formulation A showed a significant reduction in $C_{max}$ compared to the non-deuterated domperidone and both Formulation A and B showed a significant increase in AUC mean residence time compared to non-deuterated domperidone.

Example 6: Dog PK Study with Formulation A

In this study, the oral exposure of domperidone and a $d_4$-domperidone formulation was evaluated in male Beagle dogs. A capsule formulation of $d_4$-domperidone ("Formulation A" from Example 1) as repeated in Table 10 and a suspension formulation of domperidone prepared by combining 0.5% METHOCEL™ cellulose ether, 0.2% polysorbate 80 (TWEEN® 80), and 0.72% lactic acid were, independently, prepared.

TABLE 10

| Formulation A | |
|---|---|
| Ingredient | Amount (%) |
| $d_4$-domperidone | 10.0 |
| PRECIROL ® ATO 5 | 9.75 |
| Medium Chain Triglycerides | 80.25 |
| Total | 100.0 |

The $d_4$-domperidone formulation was dosed orally (PO) at 10 mg/dog, and the domperidone formulation was dosed orally at 1 mg/kg. Blood samples were collected up to 36 hours post dose and plasma concentrations of domperidone or $d_4$-domperidone were determined by LCMS/MS. Pharmacokinetic parameters were determined using Phoenix WinNonlin (v8.0) software. Average plasma concentrations and pharmacokinetic parameters are summarized in Table 11.

TABLE 11

| | Domperidone | $d_4$-domeridone (Formulation A) | Change |
|---|---|---|---|
| $C_{max}$ (ng/mL) | 52.7 (0.656) | 14.3 (3.9) | −72.87% |
| $MRT_{last}$ (hr) | 5.00 (0.327) | 14.8 (2.88) | 2.96 x |
| $AUC_\infty$ (hr · ng/mL) | 335 | 315 | −5.97% |

Figure 6:
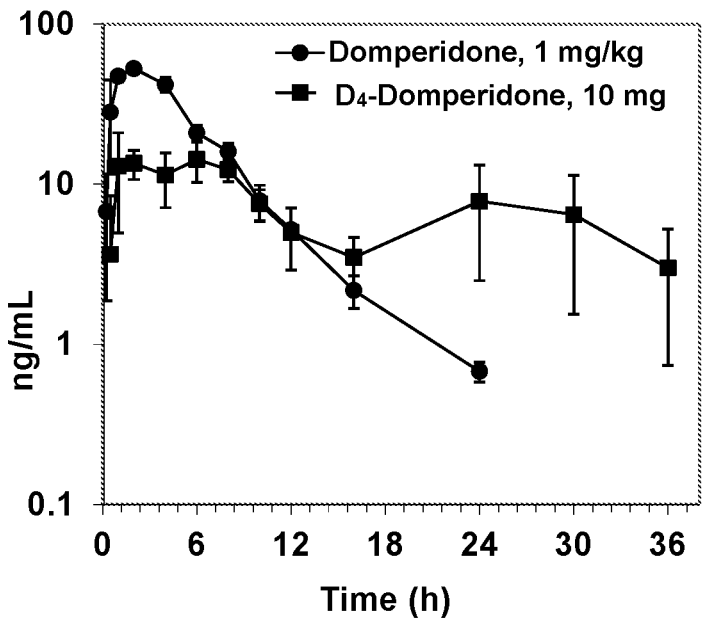
FIG. 6 is a line graph showing a pharmacokinetic profile of 1 mg/kg of domperidone and 10 mg/dog of $d_4$-domperidone dosed in dogs.

See, FIG. 6. These data illustrate that Formulation A shows similar AUC, significant reduction in $C_{max}$ and increase in mean residence time compared to non-deuterated domperidone.

Example 7: Use of Anti-Oxidants

A study was conducted to evaluate the effect of antioxidants on the degradation of $d_4$-domperidone. Samples were prepared and analyzed initially and stored at 60° C. and analyzed again after 28 days. A reversed phase HPLC method was used for the determination of impurities of $d_4$-domperidone. Gradient HPLC analysis was performed using a Waters Atlantis $dC_{18}$ (or equivalent) column, methanol containing ammonium acetate mobile phase and UV detection. The formulation is shown in Table 12 and the results for formulations with and without antioxidants is provided in Table 13.

TABLE 12

| Ingredient | % | mg/capsule |
|---|---|---|
| $d_4$-domperidone | 10.00% | 10.00 |
| PRECIROL ® ATO 5 | 9.75% | 9.75 |
| Butylatedhydroxyanisole (BHA) | 0.10% | 0.10 |
| Butylatedhydroxytoluene (BHT) | 0.05% | 0.05 |
| Medium Chain Triglycerides (MCT) | 80.1% | 80.10 |
| Total | | 100.0 mg |

TABLE 13

Summary of Impurity Results

| | % Impurity | | |
|---|---|---|---|
| Impurity Peak | Formulation without BHT/BHA T = 0 | Formulation without BHT/BHA T = 28 | Formulation with BHT/BHA |
| RRT 0.45 | 0.040 | 0.039 | 0.051 |
| RRT 0.76 | 1.548 | 1.682 | 0.045 |
| RRT 0.93 | 0.034 | 0.033 | 0.053 |
| RRT 1.09 | 0.123 | 0.108 | 0.155 |
| RRT 1.12 | 0.144 | 0.140 | 0.146 |
| RRT 1.14 | 0.373 | 0.352 | 0.381 |
| RRT 1.26 | 0.508 | 0.461 | 0.515 |
| Total Impurities | 2.77 | 2.82 | 1.35 |

These data illustrate that the formulations containing antioxidant resisted oxidation under 60° C. heat condition. However, samples lacking antioxidant, under the same heating conditions, showed significant amount of oxidation.

Example 8

$D_4$-domperidone pharmaceutical formulations were prepared and encapsulated on a GMP encapsulation machine using the amounts noted in Tables 14-16. Specifically, the compounding activities were conducted under a nitrogen blanket and yellow light. See, FIG. 7. The batches were then encapsulated using the 2C Oval die and 0.040" hole single bottom shot wedge at a temperature of about 38.7 to 51.7° C. Capsules were hand polished with a medium chain triglyceride/lecithin mixture (97% MCT/3% lecithin).

TABLE 14

Formulation for $d_4$-Domperidone Placebo Softgels Fill

| Ingredient | Theoretical Quantity/ capsule (mg) | Theoretical Quantity (g) |
|---|---|---|
| Medium Chain Triglycerides | 90.1 | 4505.0 |
| Glyceryl Distearate | 9.75 | 487.5 |
| Butylated Hydroxyanisole, NF | 0.1 | 5.0 |
| Butylated Hydroxytoluene, NF | 0.05 | 2.5 |
| Total | 100.0 | 5000.0 |

TABLE 15

Formulation for $d_4$-Domperidone 5 mg Softgels Fill

| Ingredient | Theoretical Quantity/ capsule (mg) | Theoretical Quantity (g) |
|---|---|---|
| $d_4$-Domperidone | 5.0 | 100.00 |
| Medium Chain Triglycerides | 85.1 | 1702.00 |
| Glyceryl Distearate | 9.75 | 195.00 |
| Butylated hydroxyanisole, NF | 0.1 | 2.00 |
| Butylated hydroxytoluene, NF | 0.05 | 1.00 |
| Total | 100.0 | 2000.00 |

TABLE 16

Formulation for $d_4$-Domperidone 10 mg Softgels Fill

| Ingredient | Theoretical Quantity/ capsule (mg) | Theoretical Quantity (g) |
|---|---|---|
| $d_4$-Domperidone | 10.0 | 200.00 |
| Medium Chain Triglycerides | 80.1 | 1602.00 |
| Glyceryl Distearate | 9.75 | 195.00 |
| Butylated Hydroxyanisole, NF | 0.1 | 2.00 |
| Butylated Hydroxytoluene, NF | 0.05 | 1.00 |
| Total | 100.0 | 2000.00 |

It is to be understood that while the invention has been described in conjunction with the preferred specific embodiments thereof, that the foregoing description and the examples that follow are intended to illustrate and not limit the scope of the invention. It will be understood by those skilled in the art that various changes may be made, and equivalents may be substituted without departing from the scope of the invention, and further that other aspects, advantages and modifications will be apparent to those skilled in the art to which the invention pertains. In addition to the embodiments described herein, the present invention contemplates and claims those inventions resulting from the combination of features of the invention cited herein and those of the cited prior art references which complement the features of the present invention. Similarly, it will be appreciated that any described material, feature, or article may be used in combination with any other material, feature, or article, and such combinations are considered within the scope of this invention.

The disclosures of each patent, patent application, and publication cited or described in this document are hereby incorporated herein by reference, each in its entirety, for all purposes.

What is claimed is:

1. A pharmaceutical formulation in the form of a capsule or softgel comprising:
   (i) 5 to 10% (w/w), based on the weight of the formulation, of deuterated $d_4$-domperidone of the formula (I):

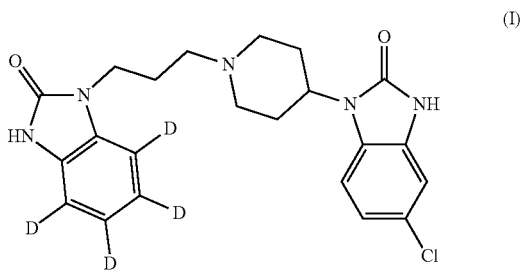 [SMILES: [2H]c1c([2H])c([2H])c2c([nH]c(=O)n2CCCN2CCC(n3c(=O)[nH]c4cc(Cl)ccc43)CC2)c1[2H]]

or a pharmaceutically acceptable salt thereof;
   (ii) 8 to 12% (w/w), based on the weight of the formulation, of glyceryl distearate, and
   (iii) 74 to 86% (w/w), based on the weight of the formulation, of medium chain triglycerides;
   wherein the pharmaceutical formulation comprises 5 to 20 mg of the deuterated $d_4$-domperidone or the pharmaceutically acceptable salt thereof.

2. The pharmaceutical formulation of claim 1, further comprising an antioxidant.

3. The pharmaceutical formulation of claim 2, wherein the antioxidant is ascorbic acid, ascorbyl palmitate, butylated hydroxyanisole, butylated hydroxytoluene, propyl gallate, potassium metabisulfite, sodium metabisulfite, sodium thiosulfate, or vitamin E.

4. The pharmaceutical formulation of claim 1, comprising 5 mg of the deuterated $d_4$-domperidone or pharmaceutically acceptable salt thereof.

5. A method for treating a disorder that is gastroparesis, nausea apart from gastroparesis, vomiting apart from gastroparesis, nausea associated with gastroparesis, vomiting associated with gastroparesis, gastroesophageal reflux disease, insufficient lactation, or a combination thereof in a patient in need thereof, comprising orally administering to the patient the formulation of claim 1.

6. The method of claim 5, wherein the disorder is gastroparesis.

7. The method of claim 5, wherein the disorder is gastroesophageal reflux disease.

8. The method of claim 5, wherein the disorder is insufficient lactation.

9. The pharmaceutical formulation of claim 1, comprising 80 to 85% (w/w), based on the weight of the formulation, of the medium chain triglycerides.

10. The pharmaceutical formulation of claim 3, wherein the antioxidant is butylated hydroxyanisole or butylated hydroxytoluene.

11. The pharmaceutical formulation of claim 1, comprising 10% (w/w) of the deuterated $d_4$-domperidone or pharmaceutically acceptable salt thereof.

12. The pharmaceutical formulation of claim 1, comprising 9% (w/w) of the glyceryl distearate.

13. The pharmaceutical formulation of claim 1, comprising 10% (w/w) of the glyceryl distearate.

14. The pharmaceutical formulation of claim 1, wherein the medium chain triglycerides have an aliphatic tail of 6 to about 12 carbon atoms.

15. The pharmaceutical formulation of claim 14, wherein the medium chain triglycerides are caproic acid, caprylic acid, capric acid, or lauric acid.

16. The pharmaceutical formulation of claim 1, comprising 78 to 82% (w/w) of the medium chain triglycerides.

17. The pharmaceutical formulation of claim 16, comprising 80% (w/w) of the medium chain triglycerides.

18. The pharmaceutical formulation of claim 16, comprising 81% (w/w) of the medium chain triglycerides.

19. The pharmaceutical formulation composition of claim 1, comprising 5% (w/w) of the deuterated $d_4$-domperidone or pharmaceutically acceptable salt thereof.

20. The pharmaceutical formulation of claim 1, comprising 10 mg of the deuterated $d_4$-domperidone or pharmaceutically acceptable salt thereof.

21. The pharmaceutical formulation of claim 1, comprising 20 mg of the deuterated $d_4$-domperidone or pharmaceutically acceptable salt thereof.

22. The pharmaceutical formulation of claim 1, comprising 5% (w/w) of the deuterated $d_4$-domperidone or pharmaceutically acceptable salt thereof.

23. The pharmaceutical formulation of claim 1, in the form of a capsule.

24. The pharmaceutical formulation of claim 1, in the form of a softgel.

* * * * *